United States Patent
Alam et al.

(10) Patent No.: US 8,267,650 B2
(45) Date of Patent: *Sep. 18, 2012

(54) SEQUENTIAL STIFFNESS SUPPORT FOR BEARING ASSEMBLIES AND METHOD OF FABRICATION

(75) Inventors: Mohsiul Alam, Chandler, AZ (US); Doug K. Spencer, Mesa, AZ (US)

(73) Assignee: Honeywell International Inc., Morristown, NJ (US)

(*) Notice: Subject to any disclaimer, the term of this patent is extended or adjusted under 35 U.S.C. 154(b) by 1074 days.

This patent is subject to a terminal disclaimer.

(21) Appl. No.: 11/929,192

(22) Filed: Oct. 30, 2007

(65) Prior Publication Data

US 2009/0110543 A1    Apr. 30, 2009

(51) Int. Cl.
*F01D 25/16*   (2006.01)
(52) U.S. Cl. ........................................... 415/229
(58) Field of Classification Search ............... 415/229; 384/535
See application file for complete search history.

(56) References Cited

U.S. PATENT DOCUMENTS

| | | | | |
|---|---|---|---|---|
| 3,589,835 | A | | 6/1971 | Linden |
| 5,110,257 | A | * | 5/1992 | Hibner et al. ............... 415/119 |
| 7,699,526 | B2 | * | 4/2010 | McMurray et al. .......... 384/99 |
| 2003/0190099 | A1 | * | 10/2003 | Alam et al. ................... 384/99 |
| 2005/0152626 | A1 | * | 7/2005 | Gerez et al. .................. 384/99 |
| 2006/0045404 | A1 | * | 3/2006 | Allmon et al. ............... 384/581 |
| 2006/0097589 | A1 | * | 5/2006 | Gerez et al. .................. 310/51 |

FOREIGN PATENT DOCUMENTS

| | | |
|---|---|---|
| EP | 0814236 A1 | 12/1997 |
| EP | 1975429 A2 | 10/2008 |

OTHER PUBLICATIONS

Great Britain Examination Search Report for Application No. GB0819631.3, mailed on Feb. 25, 2009.

* cited by examiner

*Primary Examiner* — Richard Edgar
(74) *Attorney, Agent, or Firm* — Ingrassia Fisher & Lorenz, P.C.

(57) ABSTRACT

A sequential stiffness support is provided for a bearing assembly to improve vibration characteristics of a gas turbine engine and to provide a variable structural stiffness to the support to minimize unbalance load transmissibility. In one embodiment, and by way of example only, the sequential stiffness support includes an inner ring, an outer ring, and means for coupling the inner ring and the outer ring. The sequential stiffness support is configured to provide a first stiffness support at a first engine speed and a second stiffness support at speeds greater than the first engine speed. Methods of manufacturing the sequential stiffness support are also provided.

14 Claims, 3 Drawing Sheets

SEQUENTIAL STIFFNESS SUPPORT FOR BEARING ASSEMBLIES AND METHOD OF FABRICATION

TECHNICAL FIELD

The inventive subject matter relates to a gas turbine rotor and, more particularly, to support for bearing assemblies in a gas turbine engine.

BACKGROUND

Gas turbine engines are used as the primary power source for many types of aircraft. Most turbine engines include rotating components such as a fan, a compressor, and a turbine. The rotating components may be clamped together either by a tieshaft or bolted flange joints to form a rotor group. Two or more bearing assemblies may be employed to support the rotor group. Generally, the bearing assemblies may be surrounded by a support housing, which may be connected to an engine case. As higher power to weight ratio engine designs evolve, gas turbine engine rotor bounce critical, that are typically below ground idle, move closer to ground idle and can result in higher engine vibration near idle.

During operation of the gas turbine engine and high-speed rotation of the rotor group, forces may be transmitted from the rotor group to the support housing. To damp the effects of the transmitted forces and minimize the rotor unbalance load transmission, a squeeze film damper may be included in some engines. A squeeze film damper operates by supplying fluid (usually oil) through dedicated oil delivery passages into a squeeze film cavity formed via a clearance between the support housing and the bearing assemblies.

Although squeeze film dampers are relatively useful in reducing rotor vibration in some cases, they may suffer drawbacks in others. For example, squeeze film dampers may not be as effective in case of an uncentered squeeze film, as the weight of the rotor reduces the effectiveness of the damper. In that situation, the support housing stiffness may allow the rotor group to vibrate with certain modes at some operating speed points, for example, the squeeze film damper may not adequately damp at lower speeds, resulting in a rotor-to-structure unbalance response. As a result of the weight of the rotor, the rotating rotor group may not remain concentric with the squeeze film cavity. Thus, the rotor may sit at the bottom of the damper clearance or may be unable to precess around the clearance between the bearing assembly and the support housing. As a result, the squeeze film damper may become relatively stiff during operation and may not absorb as much vibration as desired, High support stiffness sometimes bring a mode in the operating speed of very close to an operating speed increasing vibration level of the engine.

Hence, it is desirable to have an apparatus that may be used to improve the damping capabilities in a gas turbine engine and provide a support structure stiffness that minimizes a rotor-to-structure vibration transmissibility through all engine operating speeds. It is desirable for the apparatus to be capable of maintaining low vibration characteristics for the gas turbine engine for engine speeds ranging from below ground idle to higher operating speeds. It is also desirable for the apparatus to have a relatively compact design and to be capable of being retrofitted into existing engines.

BRIEF SUMMARY

The inventive subject matter provides a sequential stiffness support for a bearing assembly and methods of manufacturing the same.

In one embodiment, and by way of example only, the sequential stiffness support includes: an inner ring configured to be disposed around the bearing assembly and to extend axially along a portion thereof, an outer ring spaced apart from the inner ring and extending radially outwardly relative thereto; and a means for coupling the inner ring to the outer ring. The sequential stiffness support is configured to provide a first stiffness support to the bearing assembly at a first engine speed range and a second stiffness support to the bearing assembly at speeds greater than the first engine speed range.

In another embodiment, and by way of example only, a bearing assembly of a jet engine positioned within a support housing includes a shaft, a bearing assembly, and a sequential stiffness support. The bearing assembly is mounted to the shaft. The sequential stiffness support is disposed around the bearing assembly and includes an inner ring configured to be disposed around the bearing assembly and to extend axially along a portion thereof, an outer ring spaced apart from the inner ring and extending radially outwardly relative thereto; and a means for coupling the inner ring to the outer ring. The sequential stiffness support is configured at a first engine speed to provide a first stiffness support to the bearing assembly and provide a second stiffness support to the bearing assembly at a speed greater than the first engine speed.

In still another embodiment, and by way of example only, a method is provided for manufacturing a sequential stiffness support for disposal around a bearing assembly. The method includes forming an inner ring configured to be disposed around and to extend axially along a portion of the bearing assembly; forming an outer ring configured to be spaced apart from the inner ring extend radially outwardly relative to the inner ring; and coupling the inner ring to the outer ring with a means for coupling. The sequential stiffness support is configured to provide a first stiffness support to the bearing assembly at a first engine speed and a second stiffness support to the bearing assembly at speed greater than the first engine speed.

Other independent features and advantages of the preferred assemblies and methods will become apparent from the following detailed description, taken in conjunction with the accompanying drawings which illustrate, by way of example, the principles of the inventive subject matter.

DETAILED DESCRIPTION

The following detailed description is merely exemplary in nature and is not intended to limit the inventive subject matter or the application and uses of the inventive subject matter. Although the inventive subject matter is described as being implemented between a fan section and compressor section of a gas turbine engine, the inventive subject matter may be used with other configurations in which components are mounted to a rotor, or where the rotor may be capable of exerting an unwanted unbalance load upon a structure. Furthermore, there is no intention to be bound by any theory presented in the preceding background or the following detailed description.

Figure 1:
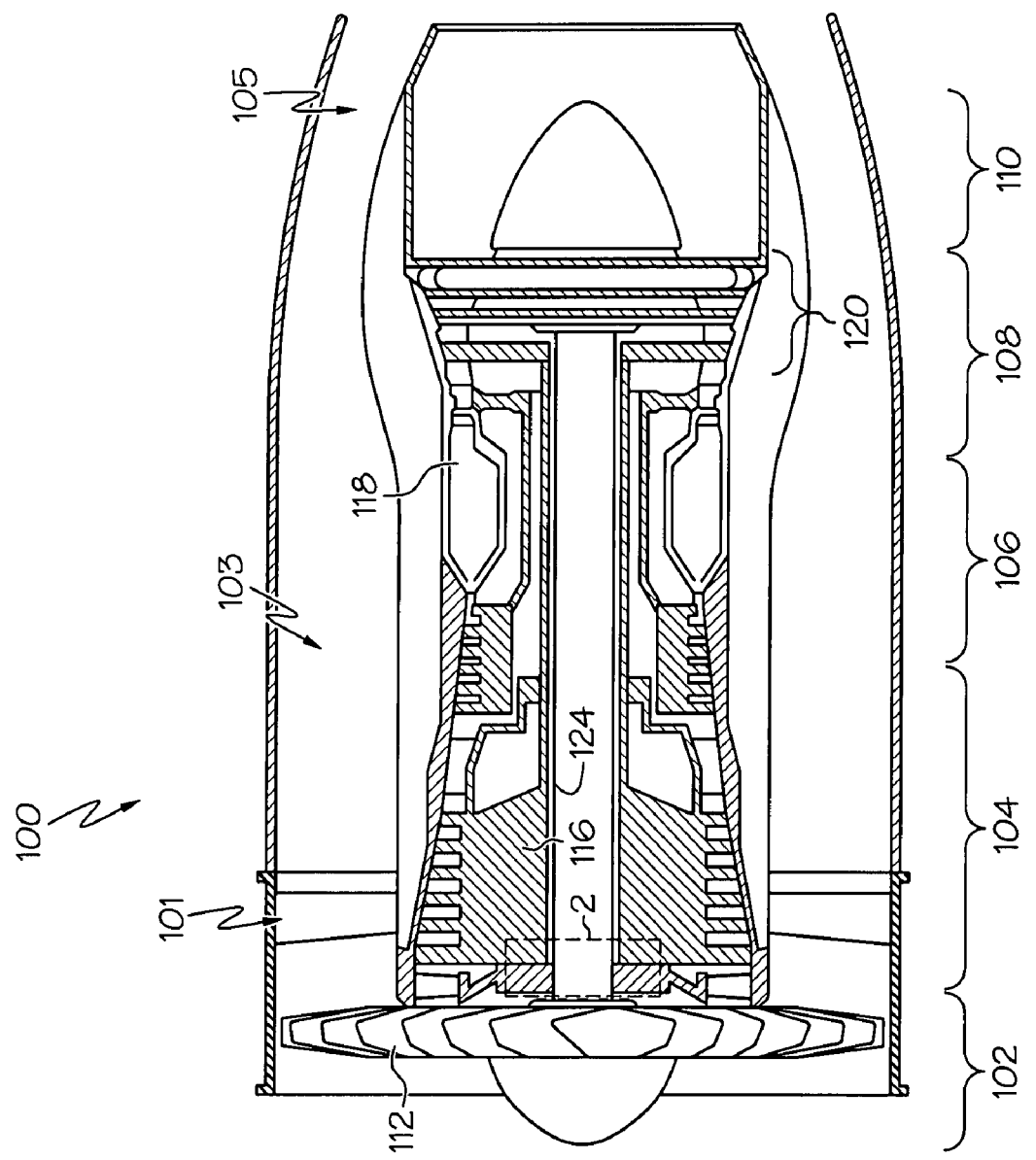
FIG. 1 is a simplified, cross-sectional view of a gas turbine engine, according to an embodiment.

FIG. 1 is a simplified, cross-sectional view of a gas turbine engine 100, according to an embodiment. The engine 100 may be disposed in an engine case 101 and may include a fan section 102, a compressor section 104, a combustion section 106, a turbine section 108, and an exhaust section 110. The fan section 102 may include a fan 112, which draws air into the fan section 102 and accelerates it. A fraction of the accelerated air exhausted from the fan 112 is directed through a bypass section 103 to provide a forward thrust. The remaining fraction of air exhausted from the fan 112 is directed into the compressor section 104.

The compressor section 104 may include series of compressors 116, which raise the pressure of the air directed into it from the fan 112. The compressors 116 may direct the compressed air into the combustion section 106. In the combustion section 106, which includes an annular combustor 118, the high pressure air is mixed with fuel and combusted. The combusted air is then directed into the turbine section 108.

The turbine section 108 may include a series of turbines 120, which may be disposed in axial flow series. The combusted air from the combustion section 106 expands through the turbines 120, causing them to rotate. The air is then exhausted through a propulsion nozzle 105 disposed in the exhaust section 110, providing additional forward thrust. In an embodiment, the turbines 120 rotate to thereby drive equipment in the engine 100 via concentrically disposed shafts or spools. Specifically, the turbines 120 may drive the compressor 116 via one or more rotors 124.

Figure 2:
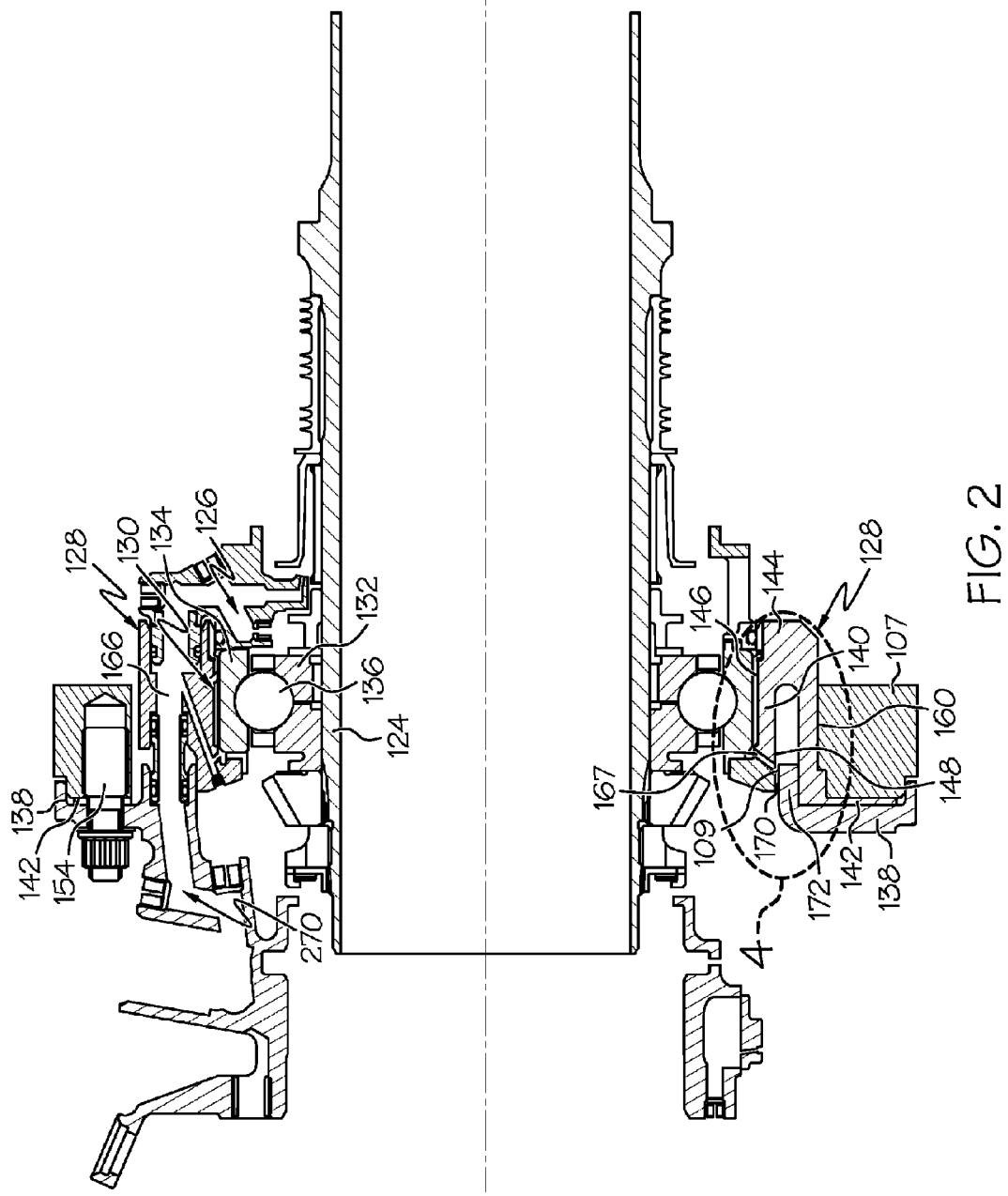
FIG. 2 is a close-up view of an area between a fan section and a compressor section of the engine indicated by a dotted line 2 shown in FIG. 1 in which a sequential stiffness support is implemented, according to an embodiment.

Turning now to FIG. 2, a close-up view of an area of the engine 100 including an engine structure 107 between the fan section 102 and the compressor section 104 indicated by a dotted line 2 shown in FIG. 1 is provided, according to an embodiment. A bearing assembly 126, sequential stiffness support 128, and squeeze film damper 130 are included to reduce vibration that may occur when the rotors 124 rotate. It should be understood that the squeeze film damper 130 is optional. The bearing assembly 126 is disposed around a portion of the rotor 124 and maintains the rotor 124 in a desired position during rotation. The bearing assembly 126 includes an inner race 132, an outer race 134, and a plurality of conventional rolling elements 136, such as balls or rollers, disposed therebetween. The inner race 132 is mounted to the rotor 124.

Figure 3:
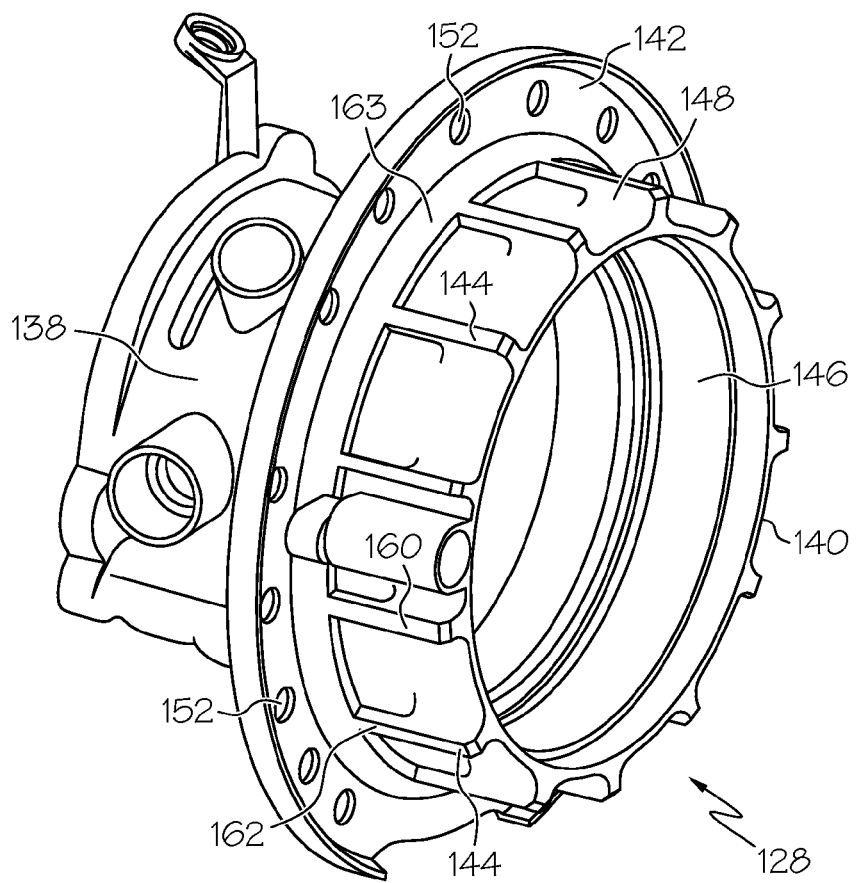
FIG. 3 is a perspective view of a sequential stiffness support, according to an embodiment.

In the embodiments illustrated, the sequential stiffness support 128 is configured to form a portion of the squeeze film damper 130 and is mounted to an annular support housing 138 (only a portion of which is shown). Referring also to FIG. 3, illustrated is a perspective view of the sequential stiffness support 128. In the depicted embodiment the support 128 includes an inner ring 140, an outer ring 142, and a means for coupling the inner ring 140 to the outer ring 142. More specifically, in this particular embodiment, the sequential stiffness support 128 includes a plurality of beams 144 coupling the inner ring 140 to the outer ring 142. The inner ring 140 extends axially along a portion of the bearing assembly 126 and includes an inner annular surface 146 and an outer annular surface 148. In an embodiment, the inner annular surface 146 has a diameter that is sufficient to accommodate the bearing assembly 126, the rotor 124, and the squeeze film damper 130. In another embodiment, the diameter of the inner annular surface 146 may also be sufficient to form radial gap between the sequential stiffness support 128 and the bearing assembly outer race 134 that forms the squeeze film damper 130. In yet another embodiment, the inner annular surface 146 may be formed to compensate for off-center characteristics that may exist in the surrounding components. For example, the rotor 124 may be off-center relative to the sequential stiffness support 128, and the inner annular surface 146 may be formed such that its center may not be coincident with the center of the outer annular surface 148.

The outer ring 142 is configured to mount the sequential stiffness support 128 to the support housing 138. In this regard, the outer ring 142 extends radially outward relative to the inner ring 140 and includes bolt openings 152 that accommodate bolts 154 therein. In an embodiment, the outer ring 142 has an inner diameter that may be greater than an outer diameter 109 of the inner ring 140.

To provide flexibility to the sequential stiffness support 128 beams 144 couple the inner and outer rings 140, 142 to each other. In a preferred embodiment, each of the beams 144 extends along a portion of the inner ring outer annular surface 148 and includes a first end portion 160 coupled to the inner ring 140 and a second end portion 162 coupled to the outer ring 142. Although the second end portions 162 are shown as being integrally formed with an attachment ring 163, which may be directly coupled to or formed with the outer ring 142, the second end portions 162 may alternatively be directly coupled to or formed with the outer ring 142. Additionally, although the second end portions 162 are shown in FIG. 3 as being disposed substantially perpendicular relative to the outer ring 142, in another embodiment, they may not be.

Figure 4:
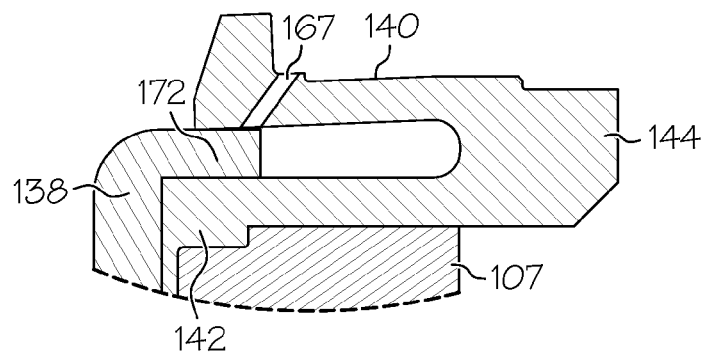
FIG. 4 is a close-up view of an area of the sequential stiffness support indicated by a dotted area 4 shown in FIG. 2.

The outer diameter 109 of the inner ring 140 in a preferred embodiment defines a controlled clearance or the gap 170 between the inner ring 140 and the portion of the support housing. In a preferred embodiment the gap 170 has a dimension in a range of 0.001-0.003 inches. During operation, the portion of the support housing 138 that extends between the inner and outer rings 140, 142 may be used as a bumper 172. As best illustrated in FIG. 4, the bumper 172 in combination with the inner ring 140 causes the gap 170, to be closed, resulting in a stiffer support. More particularly, during operation, the sequential stiffness support 128 is described as a soft support during start to the flight idle speeds wherein the gap 170 is open. During operation at higher engine speeds, the sequential stiffness support 128, and more particularly, the outer diameter 109 of the inner ring 140 deflects and bottoms out on the bumper 172 causing the gap 170 to be closed. This results in an increased stiffness to the sequential stiffness support 128. The sequential stiffness support 128 whirls under dynamic loading when it closes the gap 170 creating a journal bearing type action as the bumped surface is oil wetted from the lubricating oil available in that region.

In an embodiment, the beams 144 may be symmetrically or asymmetrically disposed around the inner and outer rings 140, 142. It will be appreciated that the particular length of the beam beams 144, the particular cross-section shape of the beams 144, and the particular number of beams 144 employed may be varied, depending on a magnitude of excursion and vibration to which the rotor 124 may be subjected or the desired structural stiffness of the sequential stiffness support 128.

In another embodiment, the means for coupling the inner and outer rings 140, 142, and more particularly the beams 144 may form a cage-like structure about the inner and outer rings 140, 142. In yet still another embodiment, the means for coupling the inner and outer rings 140, 142 may include pins.

The sequential stiffness support 128 may be configured to provide a path along which fluid may flow to the bearing assembly 126 and the squeeze film damper 130. In this regard, as illustrated in FIG. 2, the sequential stiffness support 128 may include a support transfer passage 166 formed therein that is configured to accommodate a transfer tube that may be used to provide communication between the support transfer passage 166 and a fluid source passageway 170. The inclusion of a fluid passageway 170 is detailed in co-pending patent application, bearing U.S. application Ser. No. 11/691,684, having a filing date of Mar. 27, 2007, entitled "Support Dampers for Bearing Assemblies and Methods of Manufactures", by the same assignee (now U.S. Pat. No. 7,699,526 issued Apr. 20, 2010),and incorporated herein by this reference.

Regarding methods of manufacturing the sequential stiffness support 128, each component thereof may be integrally formed, or alternatively each component may be separately formed and subsequently bonded, or otherwise attached together. In either case, an inner ring configured to be disposed around and to extend axially along a portion of the bearing assembly 126 is formed. An outer ring configured to be spaced apart from the inner ring and to extend radially outwardly relative thereto is also formed. The inner ring is then coupled to the outer ring with one or more means for coupling, such as beams, pins, or the like. In another embodiment, a transfer passage 167 may be formed between an inner ring inner surface and the inner ring outer surface (FIGS. 2 and 4).

During operation of the engine 100, the optionally included squeeze film damper 130 may absorb vibration that may result from rotor 124 rotation. The sequential stiffness support 128 also absorbs vibration from the rotor 124 by reducing vibration transmissibility arising from the softness provided by the support gap 170 exist during start to flight idle operation of the engine.

Apparatus have now been provided to improve the vibration transmissibility in a bearing assembly by providing a sequential stiffness support structure. The sequential stiffness support structure hardware distress arising from high vibration. The sequential stiffness support structure is designed to provide a soft spring rate at engine rotor speed ranges from start to above ground idle speeds and a higher spring rate at higher operating speeds. The sequential stiffness support incorporates features that provide increased stiffness after the support closes down on a gap defined by a controlled clearance creating a journal bearing type feature. The apparatus may provide low vibration characteristics for a gas turbine engine through the engine operating speeds by limiting rotor excursion. Additionally, the apparatus may be relatively compact in design and may be retrofitted into existing engines While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A sequential stiffness support for a bearing assembly of a jet engine, the sequential stiffness support positioned within a support housing and comprising:
    an inner ring configured to be disposed around the bearing assembly and to extend axially along a portion thereof and to deflect and abut against a portion of the support housing each time the jet engine accelerates to a speed greater than a first engine speed range, the abutting surfaces of the inner ring and the portion of the support housing lubricated by oil directed thereto to provide a journal bearing type action;
    an outer ring spaced apart from the inner ring and extending radially outwardly relative thereto; and
    a means for coupling the inner ring to the outer ring,
    wherein the sequential stiffness support is configured to provide a first stiffness support to the bearing assembly at the first engine speed range and a second stiffness support to the bearing assembly at the speed greater than the first engine speed range, and wherein the bearing assembly includes an inner race, an outer race, and a plurality of rolling elements disposed therebetween.

2. A sequential stiffness support as claimed in claim 1, wherein the means for coupling the inner ring to the outer ring comprises a plurality of beams.

3. A sequential stiffness support as claimed in claim 1, wherein the means for coupling the inner ring to the outer ring are disposed symmetrically about the inner ring and the outer ring.

4. A sequential stiffness support as claimed in claim 1, wherein the means for coupling the inner ring to the outer ring are disposed asymmetrically about the inner ring and the outer ring.

5. A sequential stiffness support as claimed in claim 1, wherein:
    the inner ring has an inner annular surface and an outer annular surface; and
    the sequential stiffness support further comprises a transfer passage formed between the inner ring inner and outer annular surfaces to direct oil to the abutting surfaces of the inner ring and the portion of the support housing.

6. A sequential stiffness support as claimed in claim 1, wherein the inner ring, the outer ring, and the means for coupling the inner ring to the outer ring are integrally formed.

7. A sequential stiffness support as claimed in claim 1, wherein a controlled clearance between the portion of the support housing and the inner ring is dimensioned to permit the inner ring to deflect and abut against the portion of the support housing each time the engine accelerates to a speed greater than the first engine speed range.

8. A bearing damper assembly of a jet engine positioned within a support housing, the assembly comprising:
    a shaft;
    a bearing assembly mounted to the shaft, the bearing assembly comprising an inner race, an outer race, and a plurality of rolling elements disposed therebetween;
    a sequential stiffness support disposed around the bearing assembly, the sequential stiffness support including:
        an inner ring configured to be disposed around the bearing assembly and to extend axially along a portion thereof and to deflect and abut against a bumper each time the jet engine accelerates to a speed greater than a first engine speed range, the inner ring having an inner annular surface and an outer annular surface with a transfer passage formed between the inner ring inner and outer annular surfaces and configured to supply lubricating oil to the abutting surfaces of the inner ring and the bumper to provide a journal bearing type action, the bumper formed in a portion of the support housing;
        an outer ring spaced apart from the inner ring and extending radially outwardly relative thereto; and
        a means for coupling the inner ring to the outer ring, wherein the sequential stiffness support is configured at the first engine speed range to provide a first stiffness support to the bearing assembly and provide a second stiffness support to the bearing assembly at the speed greater than the first engine speed range, the second stiffness support provided by the deflection and abutting of the inner ring against the bumper.

9. A bearing damper assembly as claimed in claim 8, wherein the bumper defines a controlled clearance between the portion of the support housing and the inner ring.

10. A bearing damper assembly as claimed in claim 9, wherein the controlled clearance is a gap having a dimension in a range of 0.001-0.003 inches formed between the inner ring and the portion of the support housing.

11. A bearing damper assembly as claimed in claim 8, wherein the means for coupling the inner ring to the outer ring comprises a plurality of beams.

12. A method of fabricating a sequential stiffness support for disposal around a bearing assembly of a jet engine positioned within a support housing, the method comprising the steps of:

forming an inner ring configured to be disposed around and to extend axially along a portion of the bearing assembly, the inner ring having an inner annular surface and an outer annular surface and a transfer passage formed between the inner ring inner and outer annular surfaces;

forming an outer ring configured to be spaced apart from the inner ring and extending radially outwardly relative to the inner ring; and coupling the inner ring to the outer ring with a means for coupling, a portion of the support housing extending between the inner and outer rings such that a controlled clearance is defined between the portion of the support housing and the outer annular surface of the inner ring, the controlled clearance dimensioned to permit the inner ring to deflect and abut against the portion of the support housing each time the jet engine accelerates to a speed greater than a first engine speed range, with lubricating oil supplied through the transfer passage to the abutting surfaces of the inner ring and the portion of the support housing;

wherein the sequential stiffness support is configured to provide a first stiffness support to the bearing assembly at a first engine speed range and a second stiffness support to the bearing assembly at the speed greater than the first engine speed range, wherein the bearing assembly comprises an inner race, an outer race, and a plurality of rolling elements disposed therebetween.

13. The method of claim 12, further comprising integrally forming the inner ring, the outer ring, and the means for coupling.

14. The method of claim 12, wherein the step of coupling the inner ring to the outer ring comprises coupling the inner ring to the outer ring with a plurality of beams.

* * * * *